(12) United States Patent
Johnasen

(10) Patent No.: US 8,777,288 B2
(45) Date of Patent: Jul. 15, 2014

(54) FOLDING ROOF RACK FOR VEHICLE

(71) Applicant: Abram Johnasen, Waianae, HI (US)

(72) Inventor: Abram Johnasen, Waianae, HI (US)

(*) Notice: Subject to any disclaimer, the term of this patent is extended or adjusted under 35 U.S.C. 154(b) by 0 days.

(21) Appl. No.: 13/766,888

(22) Filed: Feb. 14, 2013

(65) Prior Publication Data

US 2013/0229025 A1  Sep. 5, 2013

Related U.S. Application Data

(60) Provisional application No. 61/605,614, filed on Mar. 1, 2012.

(51) Int. Cl.
*B60P 3/00* (2006.01)

(52) U.S. Cl.
USPC ............................................. 296/3; 224/324

(58) Field of Classification Search
CPC ............... B60P 3/40; B60P 3/00; B60P 3/07; B60P 3/14; B60P 3/341; B60P 3/42; B60P 3/002; B60P 3/055; B60P 3/10; B60P 3/32; B60P 3/36; B60P 3/39; B60P 7/0815; B60P 7/06; B60P 7/10; B60P 7/12; B60P 1/00; B60P 1/02; B60P 1/16; B60P 1/43
USPC ...................... 296/3, 26, 37.6, 183.1; 224/324
See application file for complete search history.

(56) References Cited

U.S. PATENT DOCUMENTS

| | | | |
|---|---|---|---|
| 4,747,529 A | 5/1988 | Hinderaker | |
| 5,037,152 A * | 8/1991 | Hendricks | 296/3 |
| 5,152,570 A | 10/1992 | Hood | |
| 5,582,044 A | 12/1996 | Bolich | |
| 6,715,653 B2 | 4/2004 | DeCosta | |
| 7,494,169 B2 * | 2/2009 | Collins | 296/3 |
| 7,527,324 B1 * | 5/2009 | Clonan | 296/183.1 |
| 7,758,091 B1 | 7/2010 | McCall | |
| 2009/0166390 A1 * | 7/2009 | Flaherty | 224/405 |

* cited by examiner

*Primary Examiner* — Joseph Pape
*Assistant Examiner* — Dana Ivey
(74) *Attorney, Agent, or Firm* — Daniel Boudwin; Global International Property Agency LLC

(57) ABSTRACT

Disclosed is a roof rack for carrying cargo items with a pickup truck. The device comprises a load bar for supporting cargo items, a pair of telescoping uprights attached to the load bar, and a pair of mounts attached at a first end to the telescoping uprights, and to the side rails of the pickup truck at a second end. The load bar, telescoping uprights, and mounts are movable from an extended position to a folded position. This allows the uprights to be extended for use when carrying cargo items, and folded down for storage. The rack permits a user to transport large items with a pickup truck without requiring use of the pickup bed.

14 Claims, 5 Drawing Sheets

FOLDING ROOF RACK FOR VEHICLE

CROSS REFERENCE TO RELATED APPLICATION

This application claims the benefit of U.S. Provisional Application No. 61/605,614 filed on Mar. 1, 2012, entitled "Roof Rack." The above identified patent application is herein incorporated by reference in its entirety to provide continuity of disclosure.

BACKGROUND OF THE INVENTION

1. Field of the Invention

The present invention relates to a roof rack. More particularly, the present invention pertains to a folding roof rack for a vehicle.

A roof rack is a set of bars secured to the roof of a vehicle, and is designed for transporting items that cannot fit inside the vehicle, such as luggage, bicycles, canoes, kayaks, or skis. A roof rack enables transport of objects on the roof of the vehicle without reducing the interior space thereof. This allows for the interior of the vehicle to be used for occupants, and smaller items that fit within the cargo area. While many sport utility vehicles include factory roof racks, these devices are not designed to support bicycles, canoes, kayaks, or other large items. This has created a need for aftermarket roof rack systems that can be installed on a variety of vehicle types.

The three most common components of a roof rack system are load bars, which span the width of the vehicle; towers, which attach the load bars to the vehicle; and mounts, which secure items to the load bars. Roof racks are mounted directly to the gutter surrounding the roof line on older vehicles, while modern vehicles, which do not have gutters, mount the rack by attaching hooks to the top of the door frames. While these aftermarket roof racks can be secured to the roof of cars and sport utility vehicles, they are not adapted for attachment to the bed of a pickup truck.

Since aftermarket roof racks are not adapted for use in pickup trucks, many truck owners transport their surfboards, paddleboards, or sports equipment in the back of pickup trucks. This can be problematic when carrying cargo items that are longer than the length of the truck bed. This requires one end of the board to extend beyond the length of the bed, which makes the board susceptible to damage, or can otherwise cause a driving hazard if they obstruct the driver's view out of the back window. In addition, the boards can shift about and knock into each other during transport, which can damage the boards or the truck bed.

The present invention overcomes the problems inherent in roof racks by providing a rack that can be attached to the bed of a pickup truck. The device comprises a load bar, a pair of telescoping uprights, and a pair of mounts. The roof rack is movable from an extended position for use when carrying cargo items to a folded position for storage. The rack permits a user to transport large items with a pickup truck without requiring use of the pickup bed.

2. Description of the Prior Art

Devices have been disclosed in the prior art that relate to roof racks. These include devices that have been patented and published in patent application publications. These devices generally relate to roof racks that attach to the top of a car or sport utility vehicle. The forgoing is a list of devices deemed most relevant to the present disclosure, which are herein described for the purposes of highlighting and differentiating the unique aspects of the present invention, and further highlighting the drawbacks existing in the prior art.

Specifically, McCall, U.S. Pat. No. 7,758,091 discloses a collapsible ladder rack system for use on a pickup truck that utilizes housings, main arms, material arms, extension arms, and supporting braces. The housings are secured to the rails. The hinged main arms rise vertically and are locked into place by braces. The hinged material arms rise horizontally and lock into place with braces. The extension arms telescope out of two of the material arms and insert into the empty material arms and lock into place. While the McCall device discloses a folding roof rack, the device does not utilize a load bar, a pair of telescoping uprights attached to the load bar, and a pair of mounts attached at a first end to the telescoping uprights, and at a second end to the side rails of the pickup truck.

Hood, U.S. Pat. No. 5,152,570 discloses a side frame that is mountable on a truck and is retractable into a compact package. Each frame comprises anchor members to which support posts are pivoted and which slidably support a longitudinally extending rail at their upper ends. A plurality of load supporting members are removably attached between the rails of the side frames. The Hood device discloses a pair of telescoping rail posts adapted to fit truck beds of different lengths, and does not disclose a rack that can extend for use when carrying cargo items, and fold down for storage when not in use.

Hinderaker, U.S. Pat. No. 4,747,529 discloses a collapsible rack for use with skis or other elongated articles, comprising a pair of units adapted to be mounted spaced apart, such as on the roof of a car, each unit having a hinged assembly which when vertically upright, allows the skis to be positioned therein, and which when pivoted toward a horizontal position wedges against the skis to secure them therein. The '529 device, while disclosing a collapsible rack, has a structure that is considerably different from the present invention. The device attaches to the roof of a vehicle, and folds down to secure the skis in position. The present invention attaches to the side rails of a pickup truck, and extends for use when carrying cargo items, and folds down for storage when not in use.

DeCosta, U.S. Pat. No. 6,715,653 discloses an adjustable rack and clamping apparatus for removably retaining surfboards or the like to the roof of a vehicle, while preventing the theft thereof, includes a plurality of two types of mounting block assemblies that slidably attach to two transversely disposed mounting bars removably affixed to the vehicle. While this device discloses a pair of clamps that mount to a vehicle load bar, the roof rack is attached to a vehicle between the door and the doorframe. The DeCosta device does not attach to the side rails of a pickup truck, or extend for use or fold for storage, but instead remains in a static position when carrying cargo or when it is not in use.

Finally, Bolich, U.S. Pat. No. 5,582,044 discloses a method of locking a surfboard to a roof rack crossbar using a series of adjustable mount block assemblies affixed to the rack crossbars at a lateral position of contact with the sides of a surfboard placed horizontally on top of the crossbars. The mount block assemblies utilize a metal clamp that is vertically adjusted to the thickness of the surfboard at the lateral position of contact. An internal axle connects two side cams vertically adjacent to a center mount block with a clamp affixed within the side cams. The axle allows for the clamp assemblies to open and close by means of rotation of the side cams relative to the position of the mount block. Similar to the DeCosta device, the '044 patent describes a clamping means for attaching a device such as a surfboard to a roof rack. It does not disclose a folding roof rack that can attach to a pickup truck.

The devices disclosed in the prior art provide a variety of roof racks for transporting cargo items on the top of a vehicle.

The majority of these devices, however, attach to a vehicle and remain in a fixed position when carrying items or when not in use. While some prior art devices disclose folding roof racks, these devices do not disclose a load bar, a pair of telescoping uprights attached to the load bar, and a pair of mounts attached at a first end to the telescoping uprights, and at a second end to the side rails of the pickup truck. The present invention can be extended for use when carrying cargo items, and folded down for storage when not in use. This permits a user to transport large items with the rack, and to fold the device to prevent it from decreasing fuel efficiency.

In light of the prior art and the disclosed elements of the present invention, it is submitted that the present invention substantially diverges in design elements from the prior art. Consequently, it is clear that that present invention is not described by the art and that a need exists for a folding roof rack that attaches to a vehicle. In this regard, the instant invention substantially fulfills these needs.

SUMMARY OF THE INVENTION

In view of the foregoing disadvantages inherent in the known types of roof racks now present in the prior art, the present invention provides a new folding roof rack wherein the same can be utilized for providing convenience for the user when transporting large items with a pickup truck.

It is therefore an object of the present invention to provide a new and improved roof rack device that has all of the advantages of the prior art and none of the disadvantages.

It is another object of the present invention to provide a new and improved folding roof rack that attaches to the bed of a pickup truck.

Another object of the present invention is to provide a new and improved folding roof rack that includes a load bar for supporting cargo items, a pair of telescoping uprights attached to the load bar, and a pair of mounts attached at a first end to the telescoping uprights, and at a second end to the side rails of the pickup truck.

Another object of the present invention is to provide a new and improved folding roof rack wherein the load bar, telescoping uprights, and mounts are movable from an extended position to a folded position. This allows the uprights to be extended for use when carrying cargo items, and folded down for storage when not in use.

Yet another object of the present invention is to provide a new and improved roof rack that includes telescoping uprights that nest within a channel on the load bar when in a folded position.

Another object of the present invention is to provide a new and improved roof rack that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
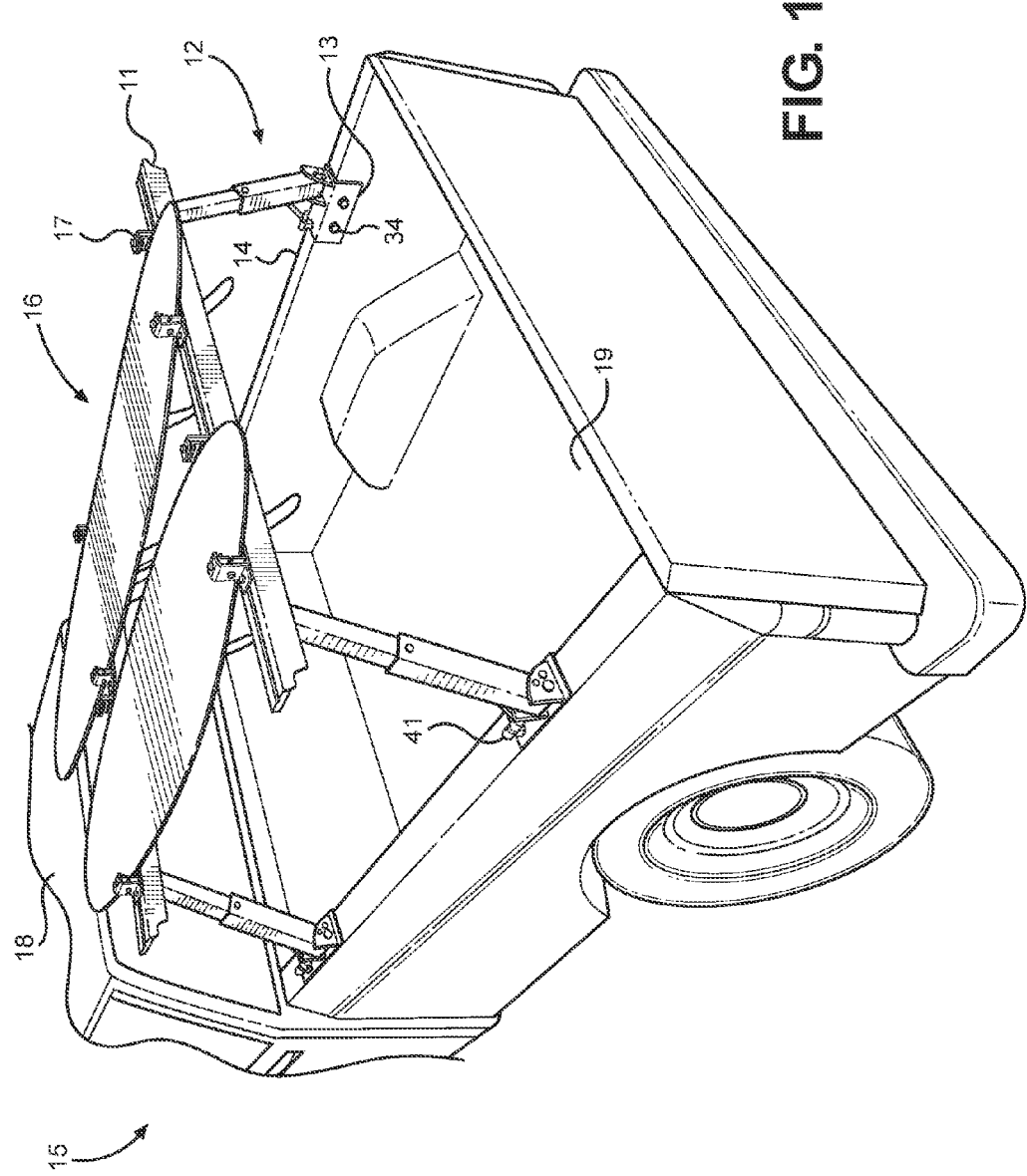
FIG. 1 shows a perspective view of the present invention attached to the bed of a pickup truck with a pair of surfboards attached thereto.

Reference is made herein to the attached drawings. Like reference numerals are used throughout the drawings to depict like or similar elements of the roof rack. For the purposes of presenting a brief and clear description of the present invention, the preferred embodiment will be discussed as used for transporting large items with a pickup truck. The figures are intended for representative purposes only and should not be considered to be limiting in any respect.

Referring now to FIG. 1, there is shown a view of the present invention, which is comprised of at least one load bar 11, at least one pair of telescoping uprights 12, and at least one pair of mounts 13 for attachment of the telescoping uprights 12 to the side rails 14 of a pickup truck 15. The load bar 11 supports the weight of cargo items 16, such as a surfboard placed thereon, and provides an attachment point for a cargo clip 17. The telescoping uprights 12 support the load bar 11 and raise them to a height that is higher than the pickup truck cab 18. The load bar 11, telescoping uprights 12, and mounts 13 can be moved from an extended use position to a folded storage position. The mounts 13 secure the uprights 12 and load bars 11 to the side rails 14, which prevent the device from shifting about when the truck 15 is in motion.

Figure 5:
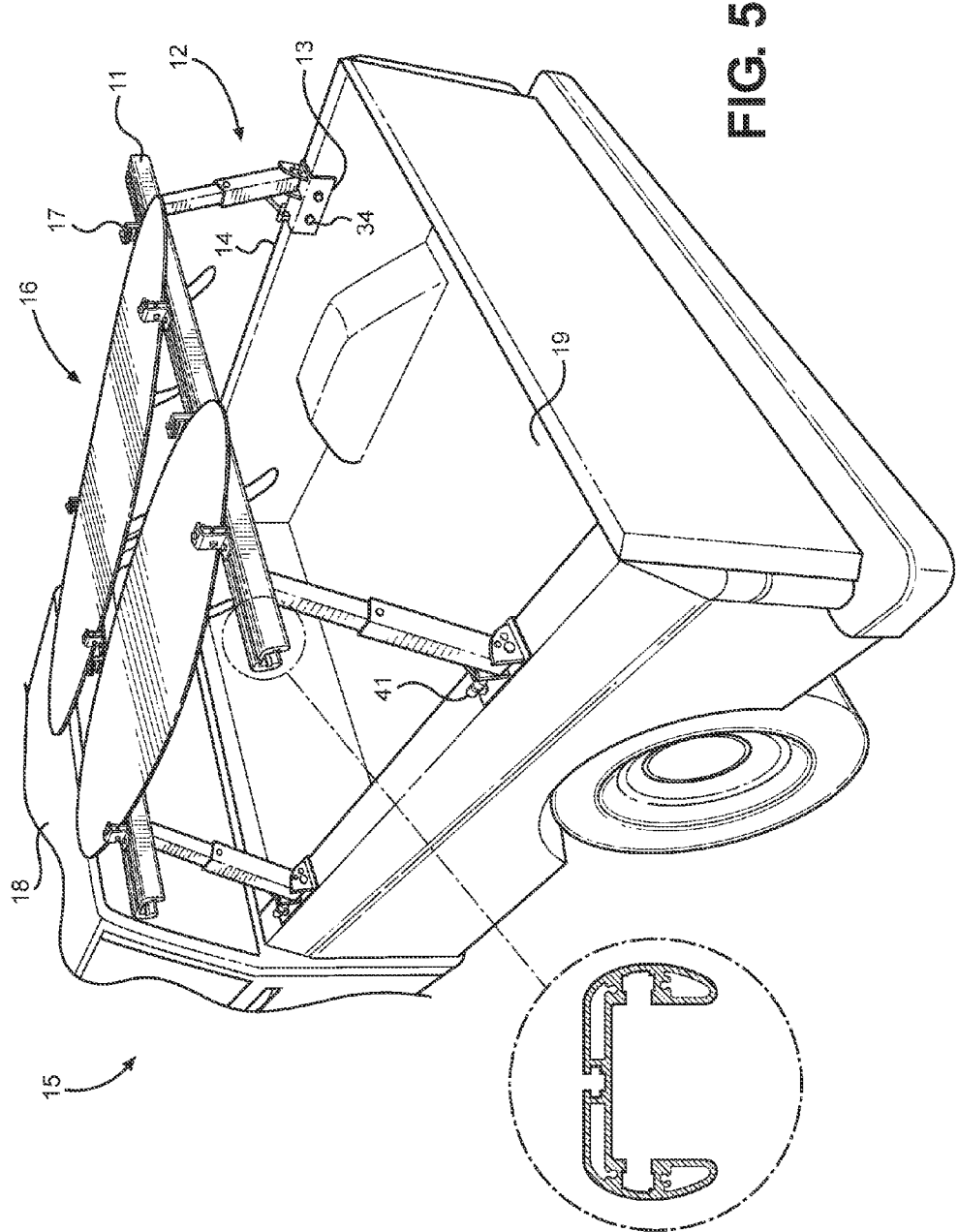
FIG. 5 shows a perspective view of the rounded leading edge of the load bar.

The load bar 11 is constructed of a durable material, such as aluminum, steel, or another suitable material that enables the bar 11 to support the weight of large cargo items 16 placed thereon. The load bar 11 is designed to span the width of the pickup truck bed 19, and can be constructed in a variety of sizes based on the make and model of vehicle it is attached to. The load bar 11 can be constructed in a variety of shapes, and preferably includes a planar top surface, which provides a location for attaching cargo 16 thereto. In an alternate embodiment as shown in FIG. 5, the leading edge of the bar 11 can be round, which increases the aerodynamics thereof and reduces the wind noise when traveling at highway speeds. The load bar 11 further includes a means of supporting a cargo clip 17 attached thereto.

The telescoping uprights 12 are pivotably attached to the mounts 13, which enable the load bar 11 and uprights 12 to move from an extended use position to a folded storage position. The telescoping uprights 12 are height adjustable, and can lock in a first position above the bed 19 of the pickup truck 15, or in a second position at the surface of the side rails 14. This enables the load bars 11 to be positioned above the cab 18 of the vehicle for use when carrying cargo 16 that is longer than the bed 19 of the truck 15, such as a surfboard, kayak, or ladder. When not in use, the uprights 12 can be locked in a storage position, which reduces the aerodynamic drag created by the load bars 11 and uprights 12 when extended. This prevents the load bars 11 and uprights 12 from decreasing the fuel efficiency of the truck 15 when not carrying cargo.

The mounts 13 provide a means of affixing the uprights 12 to the side rails 14 of the truck 15. The mounts 13 comprise an L-bracket that rests on the side rail 14 of a pickup truck 15, and attach to the side rail 14 with a fastening means, such as a bolt 34. The upright 12 is pivotably attached to the mount 13, which enables the load bar 11 and uprights 12 to lock into a storage position when not in use. The mount 13 remains fixed in position on the side rails 14, while the upright 12 can rotate towards the center of the truck 15. This ensures that the load bar 11 and uprights 12 remain securely attached to the side rails 14 when in a use or a storage position.

The load bar 11, pair of uprights 12 and pair of mounts 13 can be attached to a truck 15 in pairs or as a single roof rack unit. When attached as a pair, the first end of a cargo 16 item can rest on a first load bar 11, while the second end of a cargo 16 item can rest on a second load bar 11. This helps to evenly distribute the weight of the cargo 16, and allows for the use of the pickup truck bed 19 for carrying other items. Alternately if one load bar 11, one pair of uprights 12, and one pair of mounts 13 are used, the first end of a cargo 16 item can rest on a first load bar 11, while the second end 11 can be placed in the bed 19 of the pickup truck 15, or on the top of the cab 18.

Figure 2:
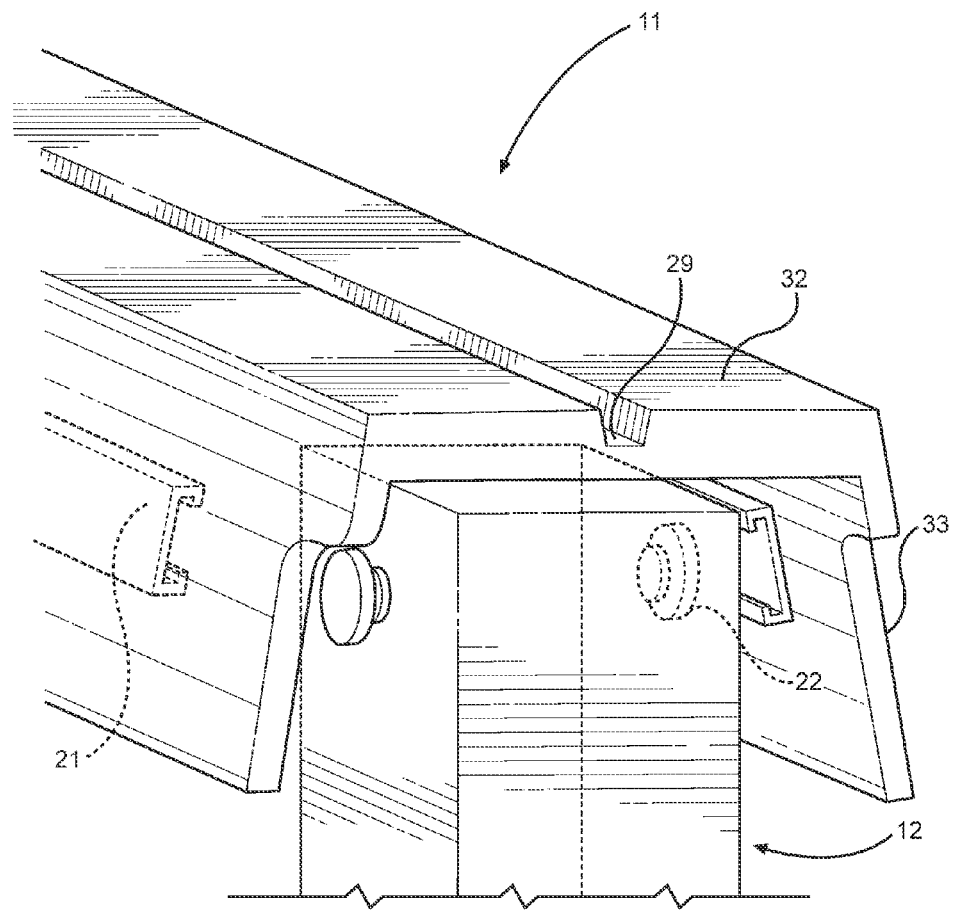
FIG. 2 shows a view of the inverted U-shaped channel on the underside of the load bar.

As best shown in FIG. 2, load bar 11 preferably comprises a planar top surface 32 with a recessed channel 29 that spans the length thereof, and a pair of side walls 33 that extend down from the planar top surface 32 to create an inverted U-shape. The side walls 33 include a pair of inner channels 21 on either side that span a portion of the interior thereof. The channels 21 are designed for use with a pair of wheels 22 that are mounted to either side of the terminal ends of the upright 12. The wheels 22 can slide along the length of the load bar 11, which enables the device to be retracted into a storage position. The channel 21 extends a sufficient length to allow the uprights 12 to lock in a use position. When locked in the use position, the wheels 22 make contact with the terminal end of the channel 21, which prevents the load bar 11 from being released from the upright 12.

Figure 3:
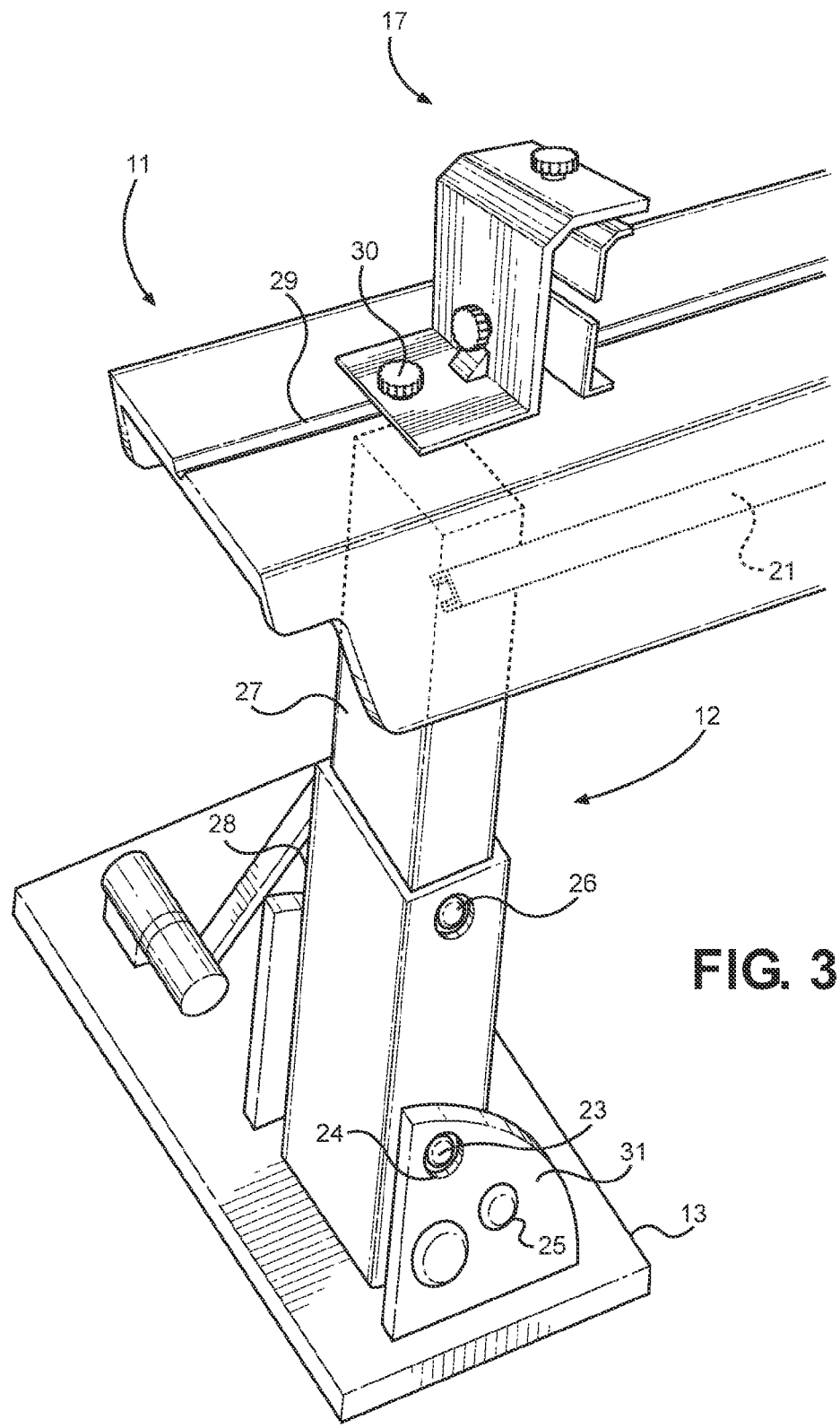
FIG. 3 shows a close-up perspective view of the load bar, upright and mount.

Referring now to FIG. 3, there is shown a close-up perspective view of the load bar 11, upright 12 and mount 13. The mount 13 includes a means of locking the uprights 12 and load bar 11 in a use position and in a storage position. Preferably, the locking means comprises a pair of upper spring-loaded pushbuttons 26, and a pair of lower spring-loaded pushbuttons 23 on either side of the upright 12. The lower pushbuttons 23 enable the upright 12 to lock within a pair of first apertures 24 or a pair of second apertures 25 on the mount 13. The first and second apertures 24, 25 are formed in a bracket 31, which is positioned on either side of the mount 13. A user can depress both lower pushbuttons 23 and rotate the upright 12 until the lower pushbuttons 23 lock into position in the first apertures 24 or second apertures 25. The first and second apertures 24, 25 are formed on the bracket 31 in such a position as to lock the uprights 12 in a use position, and in a storage position. The upper pushbuttons 26 lock the upright 12 in an extended position. The upright 12 is comprised of an upper section 27 and a lower section 28, wherein the upper section 27 is formed of a smaller diameter than the lower section 28, which enables the upper section 27 to slide within the lower section 28. This enables the uprights 12 to telescope, thereby allowing the load bar 11 and uprights 12 to be moved from a use position to a storage position.

The present invention additionally includes a means of locking a cargo item on the load bar 11. This is accomplished with a pair of cargo clips 17. The cargo clips 17 can be constructed in a variety of shapes, and are designed to lock a cargo item onto the load bar 11. The clips 17 are secured to the load bar 11, and are positioned within a recessed channel 29 on the planar surface thereof. The cargo clips 17 include a bolt 30 that is secured within the recessed channel 29. The bolt 30 can be loosened, which enables the cargo clip 17 to slide along the length of the load bar 11. Once the cargo clip 17 is properly positioned, the bolt 30 can be tightened, which in turn locks the clip 17 into position. The clip 17 enables a user to secure cargo to the load bar 11 without the use of a strap, bungee cord, or rope. Additionally, the bolt 30 can be loosened, and the clip 17 can be slid towards the terminal end of the load bar 11 for removal.

Figure 4:
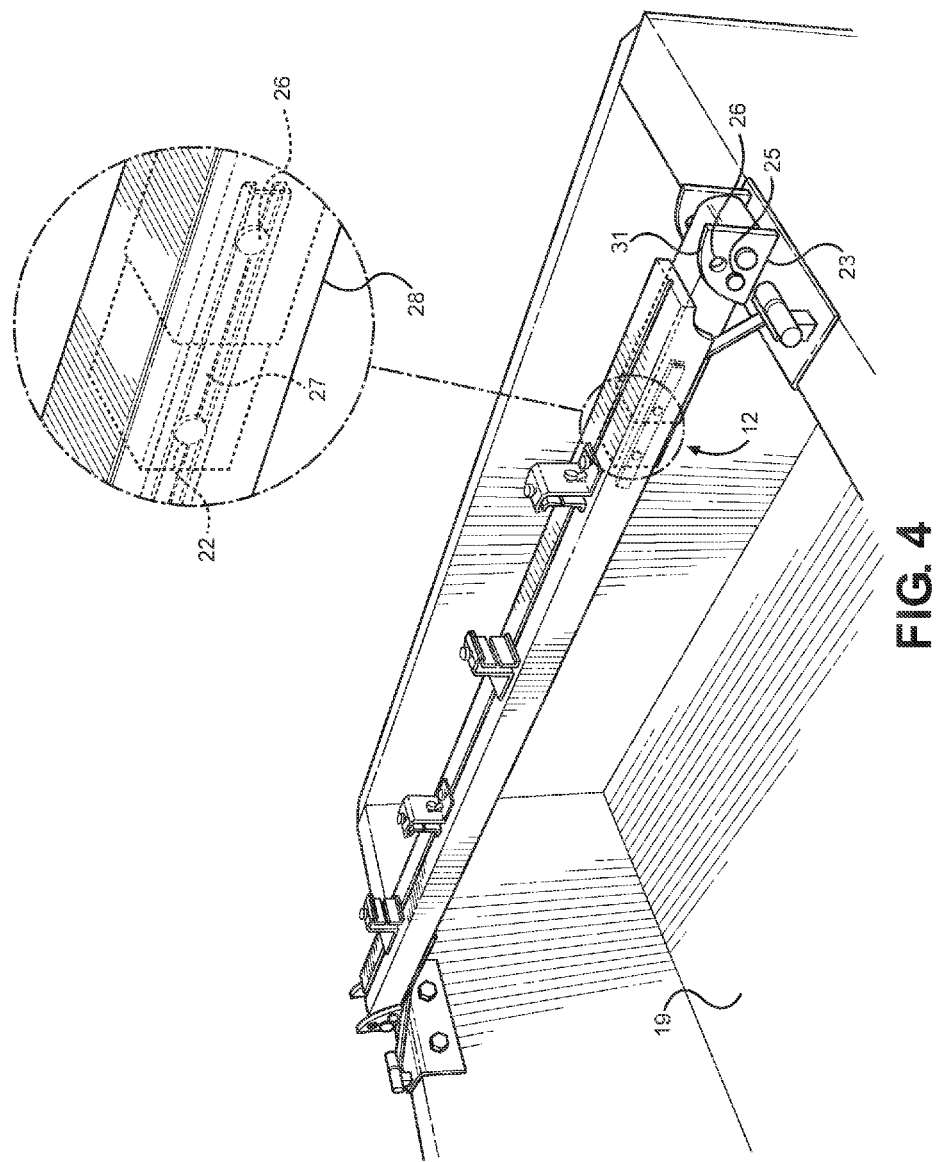
FIG. 4 shows a perspective view of the present invention, with the rack in a folded position.

Referring now to FIG. 4, there is shown a perspective view of the present invention, with the rack in a folded position. To place the rack in a folded position for storage, a user can depress the upper pushbuttons 26 and lower pushbuttons 23 on the upright 12. The release of the upper pushbuttons 26 enable the upper section 27 of the upright 12 to slide within the lower section 28, which retracts the upright 12. The release of the lower pushbuttons 23 enables the upright 12 to rotate towards the center of the pickup truck bed 19. As the upright 12 rotates, the wheels 22 slide towards the center of the load bar 11. The wheels 22 slide until the upright 12 is in a substantially horizontal position, and the load bar 11 is substantially parallel with respect to the upright 12. This enables the upright 12 to nest within the interior of the U-channel of the load bar 11. Once the upright 12 and load bar 11 are parallel, the lower pushbuttons 23 locks into position in the pair of second apertures 25 on the bracket 31. This locks the uprights 12 and load bars 11 at the level of the side rails 14.

To place the rack in a use position for carrying cargo items, a user can depress the lower pushbuttons 23, which unlocks them from the bracket 31. The user can then lift the load bars 11 up and away from the upright 12, which causes the upright 12 to move into a vertical position. As the upright 12 moves, the wheels 22 within the load bar 11 move towards the terminal ends thereof. The user can continue moving the load bar 11 up and away from the uprights 12 until the lower pushbuttons 23 lock within the first apertures 24 on the bracket 31. Once the lower pushbuttons 23 are locked into position, the user can continue to pull the load bar 11 so that the upper section 27 of the upright 12 slides out from within the lower section 28, which locks the upper pushbuttons 26 into position. The user can then attach a cargo item thereto.

Overall, the present invention provides a user with a simple and efficient means for transporting large cargo items with a pickup truck. The rack can be locked in a use position for carrying cargo, and in a folded position for storage. This prevents the rack from decreasing the fuel efficiency of the vehicle when not carrying cargo without requiring its complete removal. The rack prevents cargo items from making contact with the painted surfaces of the vehicle, wherein they could otherwise cause damage thereto. The cargo clips allow a user to quickly attach a variety of cargo items to the rack without requiring the use of a strap bungee cord, or rope. The system can be easily fitted to existing vehicles, and can be completely removed if desired.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rack for carrying cargo items with a pickup truck, comprising:
   at least one load bar having a planar top surface with a recessed channel extending a length of said planar top surface, a pair of side walls that extend down from said planar top surface to create an inverted U-shaped channel;
   a pair of cargo clips that are secured to said at least one load bar;
   said pair of cargo clips adapted to slide along said recessed channel on said planar top surface;
   at least one pair of telescoping uprights attached to said at least one load bar;
   at least one pair of mounts having a first end and a second end;
   said at least one pair of telescoping uprights pivotally attached to said first end of said at least one pair of mounts, which enables said at least one load bar and uprights to move from an extended use position to a folded storage position; and
   said second end of said at least one pair of mounts attached to side rails of a pickup truck.

2. The rack for carrying cargo items with a pickup truck of claim 1, wherein said at least one load bar further comprises a pair of inner channels on an interior surface of said pair of side walls.

3. The rack for carrying cargo items with a pickup truck of claim 1, wherein said pair of cargo clips further having a bolt that lock said pair of cargo clips into position on said at least one load bar.

4. The rack for carrying cargo items with a pickup truck of claim 1, wherein said at least one load bar further comprises a rounded leading edge.

5. The rack for carrying cargo items with a pickup truck of claim 1, wherein said at least one pair of telescoping uprights further comprise a pair of wheels on opposing sides of a proximal end thereof that are positionable within said pair of inner channels on said interior surface of said pair of side walls, and being movable within said pair of inner channels along the length of said at least one load bar.

6. The rack for carrying cargo items with a pickup truck of claim 1, wherein said at least one pair of telescoping uprights nest within said inverted U-shaped channel on said at least one load bar when in a folded storage position.

7. The rack for carrying cargo items with a pickup truck of claim 1, wherein said at least one pair of telescoping uprights are comprised of an upper section and a lower section, wherein said upper section is formed of a smaller diameter than said lower section, which enables said upper section to slide within said lower section.

8. The rack for carrying cargo items with a pickup truck of claim 1, wherein said at least one pair of telescoping uprights include a locking mechanism for locking said at least one pair of telescoping uprights in an extended use position, and in a folded storage position.

9. The rack for carrying cargo items with a pickup truck of claim 8, wherein said locking mechanism comprises a pair of upper spring-loaded pushbuttons and a pair of lower spring-loaded pushbuttons.

10. The rack for carrying cargo items with a pickup truck of claim 9, wherein said upper spring-loaded pushbuttons are positionable within a pair of apertures on said at least one pair of telescoping uprights.

11. The rack for carrying cargo items with a pickup truck of claim 1, wherein said second end of said at least one pair of mounts further comprise a bracket that attaches to said side rails of said pickup truck via a fastener.

12. The rack for carrying cargo items with a pickup truck of claim 11, wherein said second end of said at least one pair of mounts further comprises a pair of L-shaped brackets on either side of said at least one pair of telescoping uprights, said pair of L-shaped brackets having a pair of first apertures and a pair of second apertures designed to accept said lower spring-loaded pushbutton on said at least one pair of telescoping uprights.

13. A rack for carrying cargo items with a pickup truck, comprising:
   at least one inverted U-shaped load bar comprising a planar top surface having a recessed channel extending along a length of said planar top surface, and a pair of side walls having an interior surface;
   an inner channel disposed on each of said interior surface of said pair of side walls;
   a pair of cargo clips adapted to slide along said recessed channel;
   said pair of cargo clips having a bolt that lock said pair of cargo clips into a position on said at least one inverted U-shaped load bar;
   at least one pair of telescoping uprights having a first and a second end;
   said first end of said at least one pair of telescoping uprights attached to said at least one inverted U-shaped load bar;
   at least one pair of mounts having a first end and a second end;
   said second end of said at least one pair of telescoping uprights pivotally attached to said first end of said at least one pair of mounts;
   said second end of said at least one pair of mounts attached to side rails of a pickup truck.

14. A rack for carrying cargo items with a pickup truck, comprising:
   at least one inverted U-shaped load bar comprising a planar top surface having a recessed channel extending along a length of said planar top surface, and a pair of side walls having an interior surface;
   an inner channel disposed on each of said interior surface of said pair of side walls;
   a pair of cargo clips adapted to slide along said recessed channel;
   said pair of cargo clips having a bolt that lock said pair of cargo clips into a position on said at least one inverted U-shaped load bar;
   at least one pair of telescoping uprights having a first and a second end, a locking mechanism, and a pair of wheels on opposing sides of a proximal end thereof;
   said first end of said at least one pair of telescoping uprights attached to said at least one inverted U-shaped load bar;
   said locking mechanism adapted to lock said at least one pair of telescoping uprights in an extended use position and in a folded storage position via a pair of upper spring-loaded pushbuttons and a pair of lower spring-loaded pushbuttons;
   at least one pair of mounts having a first end and a second end;

said first end of said at least one pair of mounts pivotally attached to said second end of said at least one pair of telescoping uprights;

said second end of said at least one pair of mounts attached to an L-shaped bracket having at least one aperture to accept said lower spring-loaded pushbutton on said at least one pair of telescoping uprights.

\* \* \* \* \*